United States Patent
Hara et al.

(10) Patent No.: US 12,422,320 B2
(45) Date of Patent: Sep. 23, 2025

(54) ULTRASONIC PROBE

(71) Applicants: RYODEN SHONAN ELECTRONICS CORPORATION, Kamakura (JP); HONDA MOTOR CO., LTD., Tokyo (JP)

(72) Inventors: Yasushi Hara, Kamakura (JP); Toshiaki Ohashi, Kamakura (JP); Kazuhiro Tsuzaki, Wako (JP); Toshitsugu Sakakibara, Wako (JP)

(73) Assignees: RYODEN SHONAN ELECTRONICS CORPORATION, Kamakura (JP); HONDA MOTOR CO., LTD., Tokyo (JP)

( * ) Notice: Subject to any disclaimer, the term of this patent is extended or adjusted under 35 U.S.C. 154(b) by 376 days.

(21) Appl. No.: 18/010,243

(22) PCT Filed: Jun. 11, 2021

(86) PCT No.: PCT/JP2021/022407
§ 371 (c)(1),
(2) Date: Feb. 13, 2023

(87) PCT Pub. No.: WO2021/256404
PCT Pub. Date: Dec. 23, 2021

(65) Prior Publication Data
US 2023/0266190 A1 Aug. 24, 2023

(30) Foreign Application Priority Data

Jun. 15, 2020 (JP) ................................ 2020-102947

(51) Int. Cl.
*G01L 5/24* (2006.01)
(52) U.S. Cl.
CPC .................... *G01L 5/246* (2013.01)

(58) Field of Classification Search
CPC ........................................................ G01L 5/246
See application file for complete search history.

(56) References Cited

U.S. PATENT DOCUMENTS

2016/0061782 A1* 3/2016 Persson .................. B25B 23/14
73/597
2020/0039038 A1* 2/2020 Sakakibara ......... B25B 23/1425

FOREIGN PATENT DOCUMENTS

| JP | 2010125563 A | * | 6/2010 |
| JP | 2016-522405 A | | 7/2016 |
| JP | 2020-19124 A | | 2/2020 |

OTHER PUBLICATIONS

Japanese Notice of Reasons for Refusal for Japanese Application No. 2020-102947, dated Oct. 17, 2023, with an English translation.

(Continued)

*Primary Examiner* — Jamel E Williams
(74) *Attorney, Agent, or Firm* — Birch, Stewart, Kolasch & Birch, LLP

(57) ABSTRACT

An ultrasonic probe (100) includes an oscillator accommodating part (110), a first coil spring (130), and a collar (140). The oscillator accommodating part (110) has an accommodation shaft (116) having an ultrasonic oscillator (111*a*) accommodated therein, and a curved surface part (114) connected to one end portion of the accommodation shaft (116) and having formed thereon a curved surface (114*a*) facing a direction opposite to a direction in which the accommodation shaft (116) is present. The first coil spring (130) receives the curved surface (114*a*) of the curved surface part (114), and produces an elastic force pressing the curved surface (114*a*). The collar (140) accommodates the first coil spring (130) and the curved surface part (114), and restrains movement of the curved surface part (114) pressed (Continued)

by the first coil spring (130). The curved surface part (114) and the first coil spring (130) configure a spherical joint (100J).

7 Claims, 8 Drawing Sheets

(56) References Cited

OTHER PUBLICATIONS

Japanese Office Action for Japanese Application No. 2020-102947, dated Mar. 5, 2024, with English translation.
International Search Report for International Application No. PCT/JP2021/022407, dated Aug. 24, 2021, with an English translation.

\* cited by examiner

ULTRASONIC PROBE

TECHNICAL FIELD

The present disclosure relates to the structure of an ultrasonic probe.

BACKGROUND ART

As conventional technology, there is a device to measure a bolt axial force by using ultrasonic waves (for example, Patent Literature 1). Specifically, this device has an ultrasonic probe arranged inside a fastening tool, extension of a bolt is detected by ultrasonic echoes while the bolt is fastened by the fastening tool, and a bolt axial force is calculated from the extension of the bolt. In the case of this device to calculate a bolt axial force while measuring ultrasonic echoes, there is a merit not in a torque method or a lead angle method, in which bolt fastening can be performed while measuring an axial force value itself and completed with an expected axial force value.

However, stable ultrasonic measurement by appropriately keeping a relation in position between the ultrasonic probe arranged inside the fastening tool and the bolt is conventionally not easy. The reason for this is backlash occurring from a difference in dimension between the socket and the bolt head or an unfavorable relation in position between the socket and the bolt head due to a holding state of the fastening tool by a fastening operator.

CITATION LIST

Patent Literature

Patent Literature 1: JP 2020-19124

SUMMARY OF INVENTION

Technical Problem

The present disclosure is to provide the structure of an ultrasonic probe stably in contact with a bolt end portion.

Solution to Problem

An ultrasonic probe according to the present disclosure includes:
  an oscillator accommodating part having an accommodation shaft having an ultrasonic oscillator accommodated therein, and a curved surface part connected to one end portion of the accommodation shaft and having formed thereon a curved surface facing a direction opposite to a direction in which the accommodation shaft is present;
  an elastic body receiving the curved surface of the curved surface part and producing an elastic force pressing the curved surface; and
  an elastic body accommodating part accommodating the elastic body and the curved surface part and restraining movement of the curved surface part pressed by the elastic body, wherein
  the curved surface part and the elastic body configure a spherical joint.

Wherein
  the curved surface part includes
    a tapered part formed in a tapered shape on a portion connected to the one end portion of the accommodation shaft, and
  the elastic body accommodating part includes
    a restraining part restraining movement of the curved surface part by receiving the tapered shape of the tapered part.
Wherein
  the restraining part has formed thereon
    a surface in a tapered shape to be interlocked with the tapered shape formed on the tapered part.
Wherein
  the elastic body accommodating part includes
    a sliding shaft that is a shaft positioned so as to interpose the elastic body between the sliding shaft and the curved surface part to fit in a bearing, and is a shaft pressed to a direction of the curved surface part by an elastic force of an elastic body different from the elastic body and fitting in the bearing by a stopper so as not to come out of the bearing and in a slidable state.
Wherein the curved surface is part of a spherical surface.
Wherein the elastic body is a coil spring.
Wherein the accommodation shaft includes a magnet.

Advantageous Effects of Invention

In the ultrasonic probe according to the present disclosure, the curved surface part and the elastic body configure the spherical joint. Thus, it is possible to provide the structure of the ultrasonic probe stably in contact with the bolt end portion.

DESCRIPTION OF EMBODIMENTS

Figure 1:
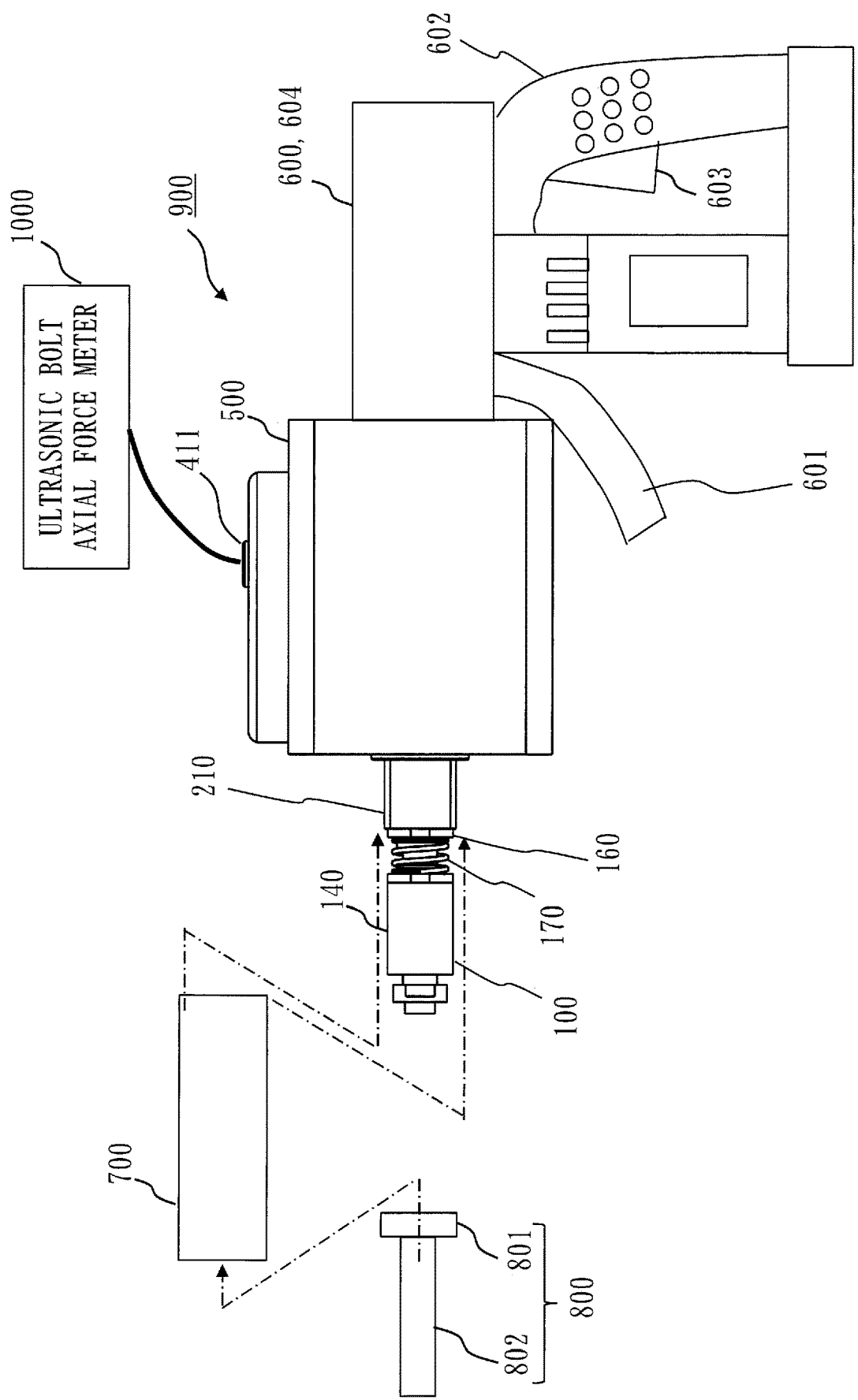
FIG. 1 is a drawing of Embodiment 1, an external view of a nut runner 900 in which an ultrasonic probe 100 is used.

In the following, an embodiment is described by using the drawings. Note in each drawing that the same or corresponding portions are provided with the same reference character. In the description of the embodiment, description of the same or corresponding portions is omitted or simplified as appropriate.

Embodiment 1

With reference to FIG. 1 to FIG. 8, an ultrasonic probe 100 of Embodiment 1 is described. A feature of the ultrasonic probe 100 resides in a spherical joint configured of a first coil spring 130 and a curved surface part 114.

DESCRIPTION OF CONFIGURATION

FIG. 1 is an external view of a nut runner 900 in which the ultrasonic probe 100 is used. The nut runner 900 includes the ultrasonic probe 100, a bearing 160, a second coil spring 170, a rotating device 500, and a power device 600.

Figure 2:
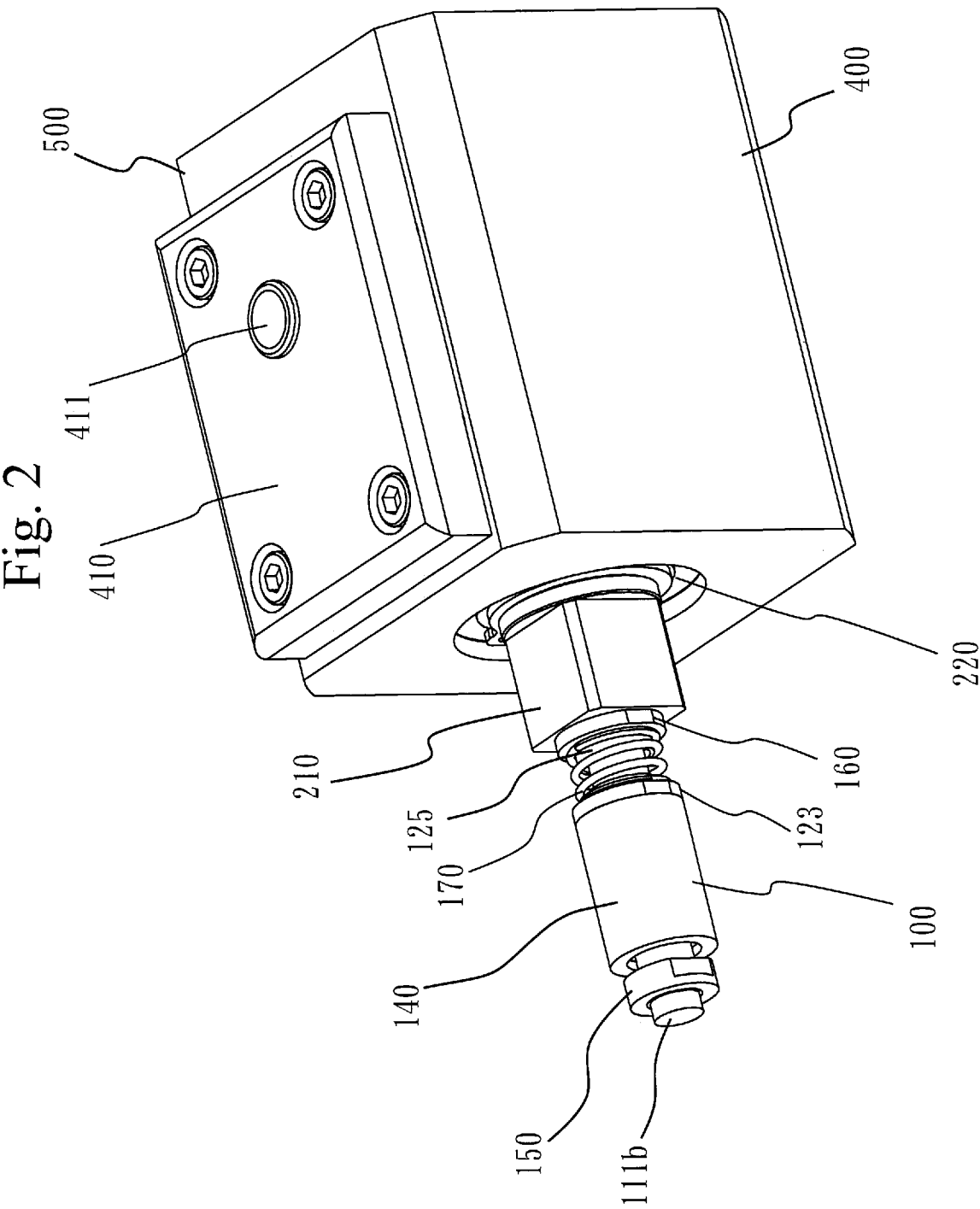
FIG. 2 is a drawing of Embodiment 1, a perspective view of a state in which the ultrasonic probe 100 and a rotating device 500 are connected together.

FIG. 2 is a perspective view of a state in which the ultrasonic probe 100 and the rotating device 500 are connected together. In FIG. 2, the ultrasonic probe 100 is in a state of not being connected to a bolt as a fastening target. The ultrasonic probe 100 is attached to a tip of a drive square 210 included in the rotating device 500 via the bearing 160 and the second coil spring 170. The drive square 210 fits in an insertion square, not illustrated, of a socket 700. The rotating device 500 is attached to the power device 600. An operator holds the nut runner 900 having the ultrasonic probe 100, the rotating device 500, and the power device 600 integrated together by a first grip 601 and a second grip 602. In this holding state, for example, with the operator pressing a switch 603 with the index finger, a motor, not illustrated, which the power device 600 has is rotated, and a drive square, not illustrated, which the power device 600 has is rotated, thereby causing a rotating hollow shaft 200 of the rotating device 500 described below to rotate. Since the insertion square, not illustrated, of the socket 700 fits in the drive square 210 of the rotating hollow shaft 200, the socket 700 rotates. With the above-described series of operation, the operator can fasten a bolt 800 by the nut runner 900. While the operator is fastening the bolt 800 by the nut runner 900, an ultrasonic oscillator 111a accommodated in the ultrasonic probe 100 produces an ultrasonic wave, and receives an echo of the produced ultrasonic wave. The ultrasonic oscillator 111a converts the received echo to an echo signal and outputs the echo signal. This echo signal can be converted to an axial force occurring to the bolt 800. An ultrasonic bolt axial force meter 1000 calculates an axial force occurring to the bolt 800 from this echo signal.

Figure 3:
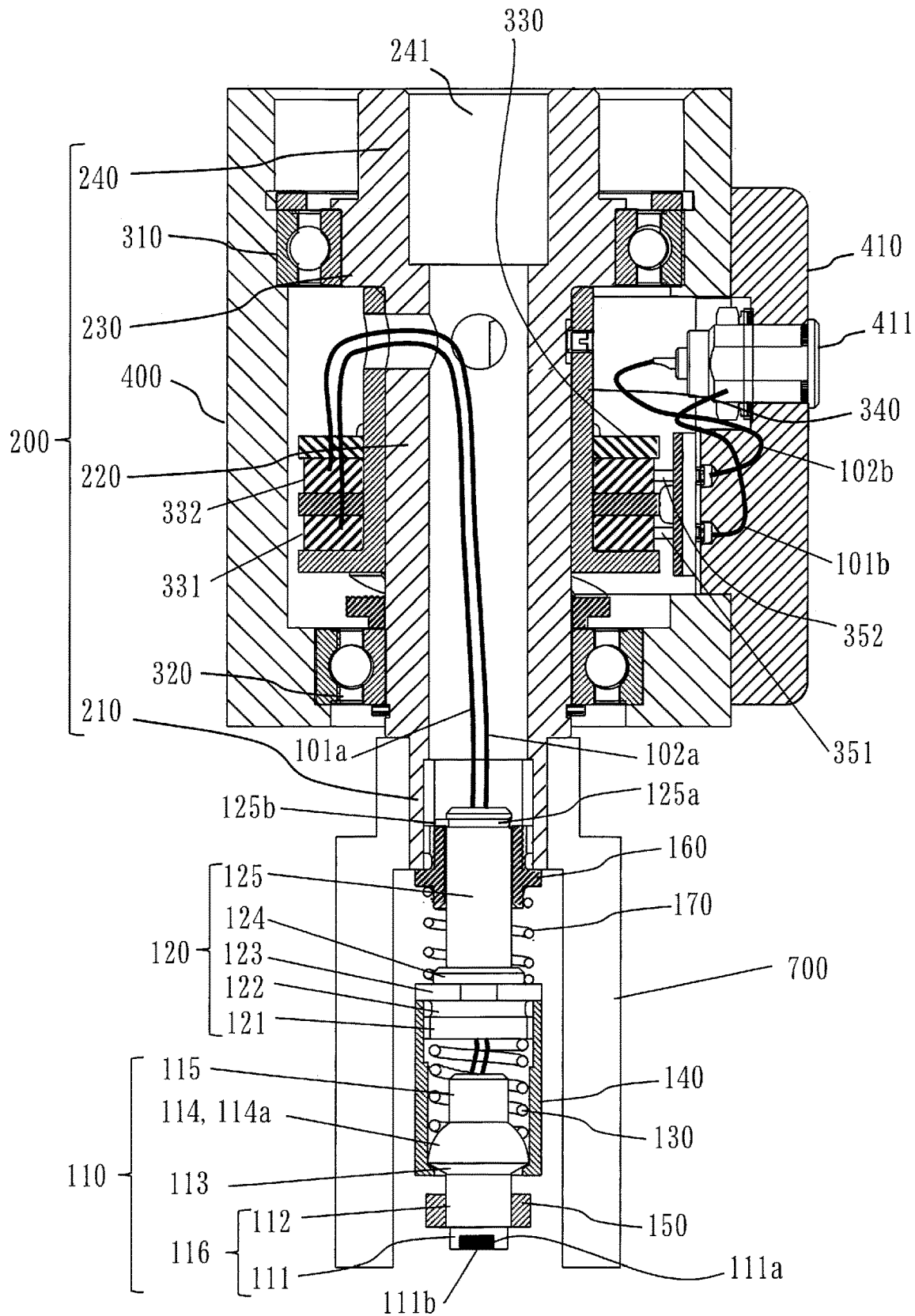
FIG. 3 is a drawing of Embodiment 1, a sectional view of FIG. 2.

FIG. 3 is a sectional view of FIG. 2. While a state is illustrated in FIG. 3 in which the socket 700 is attached, hatching of the socket 700 is omitted. Also, in FIG. 3, an oscillator accommodating part 110 and a sliding part 120 are not cut out.

Figure 4:
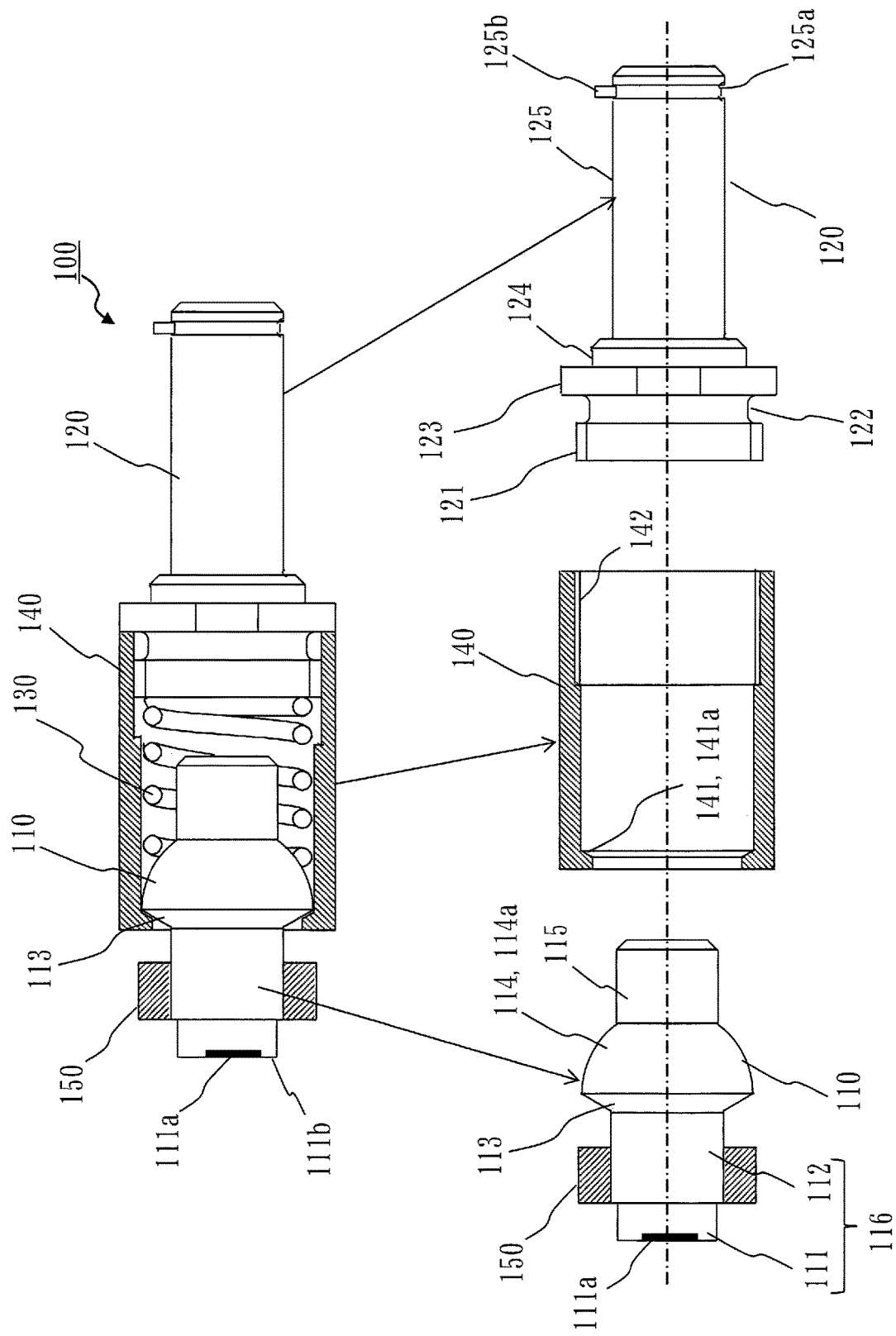
FIG. 4 is a drawing of Embodiment 1, a drawing of the ultrasonic probe 100 extracted from FIG. 3.

FIG. 4 is a drawing of the ultrasonic probe 100 extracted from FIG. 3.

Figure 5:
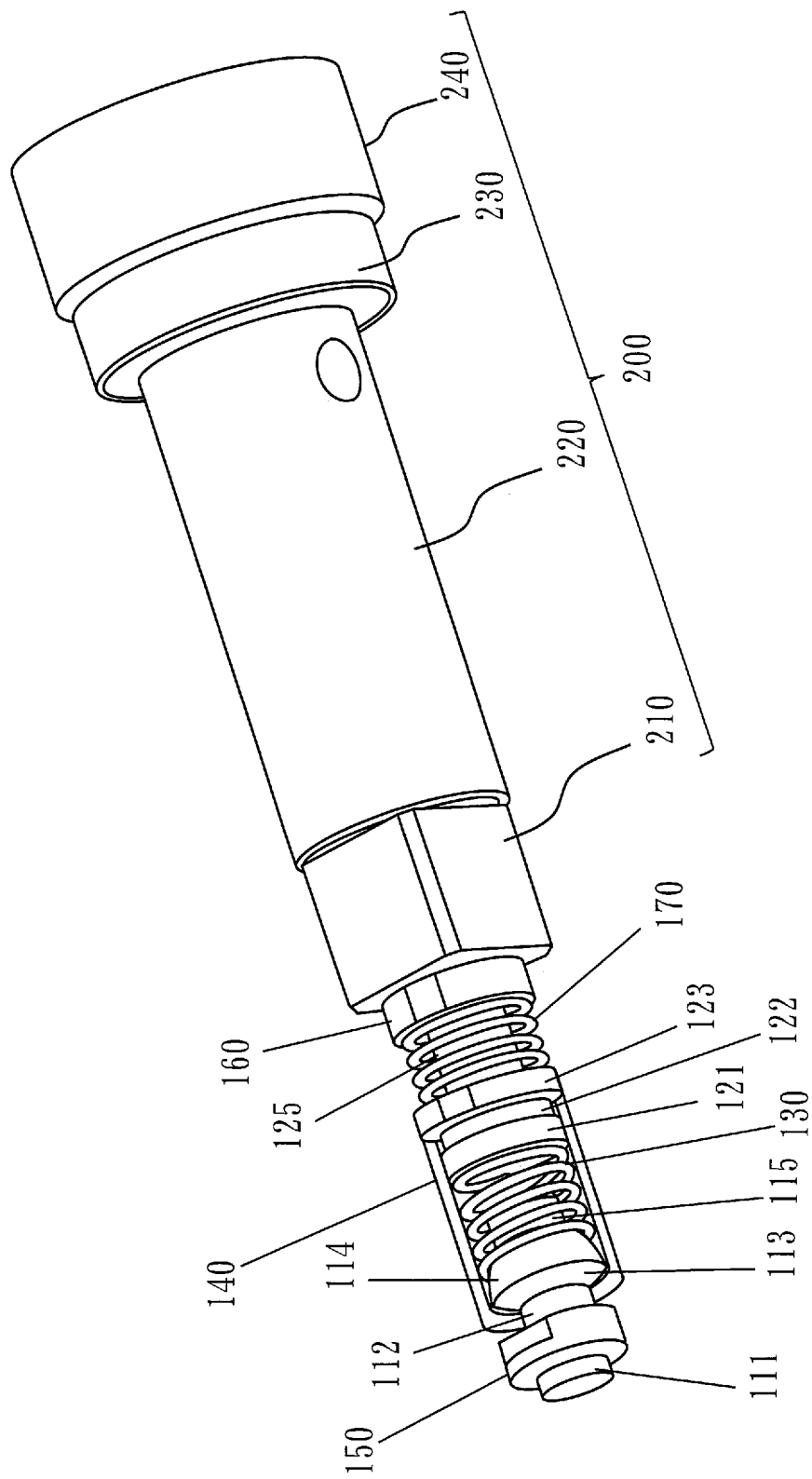
FIG. 5 is a drawing of Embodiment 1, illustrating a state in which the ultrasonic probe 100 is attached to a rotating hollow shaft 200 via a bearing 160 and a second coil spring 170.

FIG. 5 illustrates a state in which the ultrasonic probe 100 is attached to the rotating hollow shaft 200 via the bearing 160 and the second coil spring 170. In FIG. 5, a state is illustrated in which a collar 140 is seen through. With reference to FIG. 3 to FIG. 5, the structure of the ultrasonic probe 100 and the rotating device 500 is described in a state before the ultrasonic probe 100 makes contact with a hexagon bolt head 801 of the bolt 800.

<Ultrasonic Probe 100>

As illustrated in FIG. 4 and FIG. 5, the ultrasonic probe 100 includes the oscillator accommodating part 110, the sliding part 120, a first coil spring 130, the collar 140, and a magnet 150.

<Oscillator Accommodating Part 110>

The oscillator accommodating part 110 includes an oscillator arrangement shaft 111, a magnet arrangement shaft 112, a curved surface part 114, and a curved-surface-part-side shaft 115.

(1) The oscillator arrangement shaft 111 is a shaft having the ultrasonic oscillator 111a accommodated therein.

(2) The magnet arrangement shaft 112 is a shaft extending from the oscillator arrangement shaft 111 and having the magnet 150 arranged thereon. The oscillator arrangement shaft 111 and the magnet arrangement shaft 112 configure an accommodation shaft 116.

(3) The curved surface part 114 is connected to one end portion of the magnet arrangement shaft 112. The curved surface part 114 has formed thereon a curved surface 114a facing a direction opposite to a direction in which the magnet arrangement shaft 112 is present. The curved surface 114a preferably has a shape that is part of a spherical surface. However, the shape is not limited to a spherical surface, and is only required to be a curved-surface shape that can configure a spherical joint 100J together with the first coil spring 130. The curved surface part 114 includes a tapered part 113 formed in a tapered shape at a portion connected to an end portion of the magnet arrangement shaft 112.

(4) The curved-surface-part-side shaft 115, which is a shaft on a side of the curved surface part 114, extends from the curved surface part 114 to a direction opposite to the magnet arrangement shaft 112. The oscillator accommodating part 110 has a shape obtained by cutting out one column to produce the oscillator arrangement shaft 111, the magnet arrangement shaft 112, the tapered part 113, the curved surface part 114, and the curved-surface-part-side shaft 115.

<Sliding Part 120>

As illustrated in FIG. 4, the sliding part 120 includes a thread part 121, a connecting part 122, a collar receiving part 123, a spring holding part 124, and a sliding shaft 125.

(1) The thread part 121 is interlocked with a thread part 142 formed on the collar 140. To the thread part 121, the collar 140 is attached in a fixed state.

(2) The connecting part 122 connects the thread part 121 and the collar receiving part 123 together.

(3) The collar receiving part 123 receives an end face of the collar 140.

(4) As illustrated in FIG. 3, the spring holding part 124 holds the second coil spring 170.

(5) As illustrated in FIG. 3, the sliding shaft 125 is attached to the bearing 160 in a state of being able to slide the bearing 160. The sliding part 120 has a shape obtained by cutting out one column to produce the thread part 121, the connecting part 122, the collar receiving part 123, the spring holding part 124, and the sliding shaft 125.

<First Coil Spring 130>

The first coil spring 130 is an elastic body receiving the curved surface 114a of the curved surface part 114 and also producing an elastic force pressing the curved surface 114a. The first coil spring 130 is compressed by being interposed between the curved surface part 114 and the thread part 121 in a state in which an inner diameter side is guided by the curved-surface-part-side shaft 115, and an elastic force of extending by compression is produced. In FIG. 4, an end portion of the first coil spring 130 on a thread part 121 side is received by the thread part 121. The thread part 121 is in a stated of being fixed to the collar 140. An end portion of the first coil spring 130 on a curved surface part 114 side presses the curved surface 114a of the curved surface part 114. Here, the tapered part 113 abuts on a restraining part 141 of the collar 140. The restraining part 141 restrains movement of the curved surface part 114. Here, the first coil spring 130 is in a compressed state. Note that when an incidence surface 111b of the end portion of the oscillator arrangement shaft 111 abuts on the hexagon bolt head 801, the first coil spring 130 has a spring constant to the extent of allowing compression. Here, the incidence surface 111b is a surface where an echo enters the ultrasonic oscillator 111a. The direction of the normal of the incidence surface 111b matches the direction of the cylinder axis of the oscillator arrangement shaft 111 when it is regarded as a cylinder.

<Collar 140>

The collar 140 accommodates the first coil spring 130 as an elastic body and the curved surface part 114, and restrains movement of the curved surface part 114 pressed by the first coil spring 130 as an elastic body. The collar 140 is an elastic body accommodating part. The collar 140 has a shape of a hollow cylinder. The curved surface part 114 and the first coil spring 130 configure the spherical joint 100J. In the spherical joint 100J, the curved surface part 114 can rotate in a range in which the curved-surface-part-side shaft 115 of the oscillator accommodating part 110 does not interfere with the inside of the collar 140. As illustrated in FIG. 4, the collar 140 as an elastic body accommodating part includes the restraining part 141. The restraining part 141 receives the tapered shape of the tapered part 113, thereby restraining movement of the curved surface part 114. The restraining part 141 has formed thereon a surface 141a in a tapered shape interlocked with the tapered shape formed on the tapered part 113. As illustrated in FIG. 4, the collar 140 as an elastic body accommodating part includes the sliding shaft 125. The sliding shaft 125 is a shaft positioned so as to interpose the first coil spring 130 between itself and the curved surface part 114 to fit in the bearing 160. And the sliding shaft 125 is a shaft pressed to the direction of the curved surface part 114 by the elastic force of the second coil spring 170 as an elastic body different from the first coil spring 130. The sliding shaft 125 fits in the bearing 160 by a stopper 125b so as not to come out of the bearing 160 and in a state of being slidable with respect to the bearing 160.

<Magnet 150>

The magnet 150 is arranged on the magnet arrangement shaft 112. The magnet 150 has an effect of pulling the hexagon bolt head 801 to a direction of the incidence surface 111b (FIG. 2) of the echo when the socket 700 is set to the hexagon bolt head 801. The magnet 150 also has an effect of pressing the incidence surface 111b of the echo onto the hexagon bolt head 801 by a generated magnetic force with constant pressing pressure.

<Attachment of Ultrasonic Probe 100 to Rotating Device 500>

With reference to FIG. 3, attachment of the ultrasonic probe 100 to the rotating device 500 is described. The operator draws the second coil spring 170 through the sliding shaft 125, and draws the sliding shaft 125 through the bearing 160 in a state of not being attached to the drive square 210. The operator attaches the stopper 125b to a groove 125a at the tip of the sliding shaft 125 protruding from the bearing 160. The operator attaches the bearing 160, which is in a state of having the sliding part 120 attached thereto, to the drive square 210. On the outer circumference of the bearing 160, a thread is formed. Also inside the drive square 210, a thread is formed. With these threads interlocked together, the bearing 160 is fixed to the drive square 210. In a state in which the bearing 160 is fixed to the drive square 210, the sliding shaft 125 of the sliding part 120 freely slides with respect to the bearing 160. Here, the second coil spring 170 is in a compressed state, and tries to extend. The incidence surface 111b abuts on the hexagon bolt head 801. When the incidence surface 111b is pressed from the hexagon bolt head 801, the second coil spring 170 has a spring constant to the extent of further allowing compression. Note that when the second coil spring 170 is compressed and deflected, the first coil spring 130 is also compressed and deflected.

<Rotating Device 500>

With reference to FIG. 2, FIG. 3, and FIG. 5, the rotating device 500 is described. The rotating device 500 includes the rotating hollow shaft 200, a first bearing 310, a second bearing 320, a slip ring structure part 330, a holding member 340, a casing 400, a signal takeout part 410, and an output connector 411.

(1) The rotating hollow shaft 200 has an insertion square 241 formed thereon. In the insertion square 241, a drive square, not illustrated, the power device 600 has fits. In FIG. 3, there is a space from the insertion square 241 over the sliding part 120. The rotating hollow shaft 200 includes the drive square 210, a first cylindrical part 220, a second cylindrical part 230, and a third cylindrical part 240. In the drive square 210, the insertion square of the socket 700 fits.

(2) The first bearing 310 and the second bearing 320 hold the rotating hollow shaft 200.

(3) The slip ring structure part 330 has a general slip ring structure configured of a first copper ring 331, a second copper ring 332, a first brush 351, and a second brush 352. The slip ring structure part 330 outputs an output signal of the ultrasonic oscillator 111a to the first brush 351 and the second brush 352. The slip ring structure part 330 rotates with the rotating hollow shaft 200. Note that the first brush 351 and the second brush 352 do not rotate and are in a fixed state.

Although illustration of a first lead wire 101a and a second lead wire 102a inside the oscillator accommodating part 110 and inside the sliding part 120 are omitted in FIG. 3, the first lead wire 101a and the second lead wire 102a are connected to the ultrasonic oscillator 111a, and the first lead wire 101a and the second lead wire 102a take the ultrasonic oscillator 111a as a starting point and the first copper ring 331 and the second copper ring 332 as an end point. The first copper ring 331 and the second copper ring 332 are connected to the first brush 351 and the second brush 352, respectively. The first brush 351 and the second brush 352 are connected to a first brush lead wire 101b and a second brush lead wire 102b, respectively. The first brush lead wire 101b and the second brush lead wire 102b are connected to the output connector 411. With the above-described connection of the lead wires, the echo signal outputted from the ultrasonic oscillator 111a is transferred to the first copper ring 331, the second copper ring 332, the first brush 351, the second brush 352, and the output connector 411.

(4) The holding member 340 holds the slip ring structure part 330, and rotates with the rotating hollow shaft 200 and the slip ring structure part 330.

(5) The casing 400 accommodates the rotating hollow shaft 200, the first bearing 310, the second bearing 320, the slip ring structure part 330, the holding member 340, and the first brush 351 and the second brush 352.

(6) In the signal takeout part 410, the output connector 411 is arranged. As illustrated in FIG. 1, from the output connector 411, the echo signal detected by the ultrasonic oscillator 111a is outputted to the ultrasonic bolt axial force meter 1000.

<Bolt Fastening Process>

Figure 6:
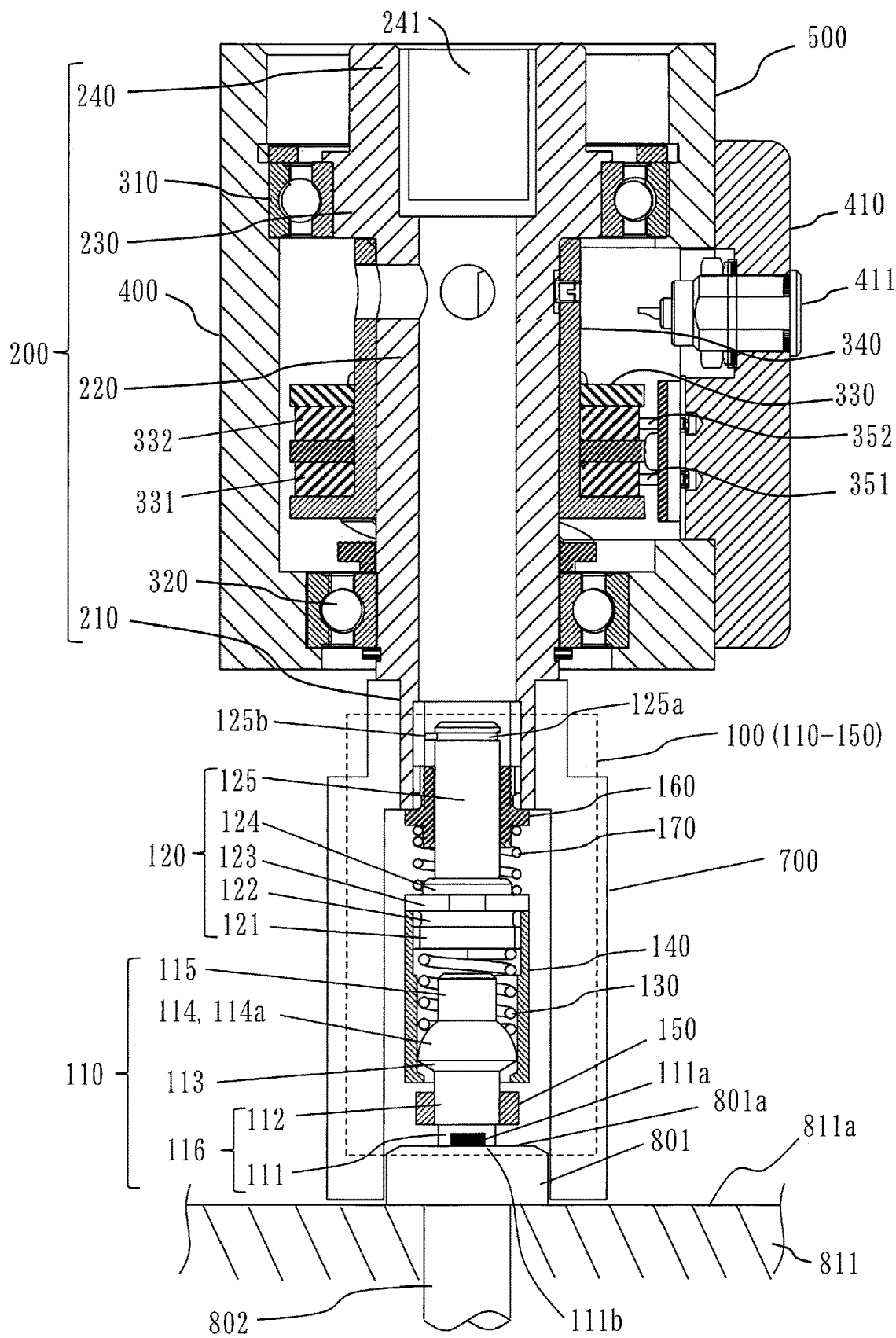
FIG. 6 is a drawing of Embodiment 1, a sectional view for describing a process by an operator to fasten a bolt 800 by using the nut runner 900.

FIG. 6 is a drawing for describing a process by the operator to fasten the bolt 800 by using the nut runner 900. With reference to FIG. 6, the process by the operator to fasten the bolt 800 by using the nut runner 900 is described. In FIG. 6, a fastened subject 811 to be fastened with the bolt 800 is illustrated. With the nut runner 900 fastening the bolt 800, the fastened subject 811 is fastened with a counterpart member not illustrated.

(1) The operator sets the socket 700 of the nut runner 900 including the ultrasonic probe 100 to the hexagon bolt head 801.

(2) When the operator presses the socket 700 to a direction from the hexagon bolt head 801 to the bolt shaft 802, in FIG. 6, the tip of the socket 700 abuts on an upper surface 811a of the fastened subject 811, and the socket 700 cannot be pressed further to the direction from the hexagon bolt head 801 to the bolt shaft 802. It is designed that, in a state in which the socket 700 cannot be pressed further, the incidence surface 111b of the oscillator arrangement shaft 111 abuts on an upper surface 801a of the hexagon bolt head 801. In the state in which the incidence surface 111b abuts on the upper surface 801a of the hexagon bolt head 801, the first coil spring 130 and the second coil spring 170 are compressed more than before the incidence surface 111b abuts on the upper surface 801a of the hexagon bolt head 801, but both are not in a close-contact state. In the state in which the socket 700 cannot be pressed further, a spring reaction force occurring to the first coil spring 130 and the second coil spring 170 has a magnitude to the extent that the incidence surface 111b of the oscillator arrangement shaft 111 is stably pressed onto the upper surface 801a of the hexagon bolt head 801.

(3) In the state in which the socket 700 cannot be pressed further, when the operator presses the switch 603 illustrated in FIG. 1, the rotating hollow shaft 200 rotates as in the above description. That is, the drive square 210 rotates. Thus, the socket 700 fitting in the drive square 210 rotates and, by the socket 700, the bolt 800 is gradually fastened.

(4) Here, the ultrasonic oscillator 111a accommodated in the oscillator arrangement shaft 111 emits an ultrasonic wave and also receives an echo of the ultrasonic wave. The ultrasonic oscillator 111a converts the received echo to an echo signal and outputs the echo signal. As illustrated in FIG. 3, the eco signal is transferred via the first lead wire 101a and the second lead wire 102a connected to the ultrasonic oscillator 111a to the first copper ring 331 and the second copper ring 332. The echo signal transferred to the first copper ring 331 and the second copper ring 332 is transferred, by a contact between the first copper ring 331 and the first brush 351 and a contact between the second copper ring 332 and the second brush 352, via the first brush lead wire 101b and the second brush lead wire 102b to the output connector 411. The echo signal transferred to the output connector 411 is sent via the output connector 411 to the ultrasonic bolt axial force meter 1000.

(5) The ultrasonic bolt axial force meter 1000 calculates an axial force occurring to the bolt 800 from the echo signal.

In FIG. 6, an axis line 803 of the bolt shaft 802 and an axis line of the rotating hollow shaft 200, that is, an axis line 703 of the socket 700, are in the same direction. Thus, there is no influence on the ultrasonic oscillator 111a due to a difference between the axis line 803 of the bolt shaft 802 and the axis line 703 of the socket 700. Here, when the socket 700 is regarded as a cylinder, the axis line 703 of the socket 700 is the center axis of the cylinder. When the bolt shaft 802 is regarded as a cylinder, the axis line 803 of the bolt shaft 802 is the center axis of the cylinder.

Figure 7:
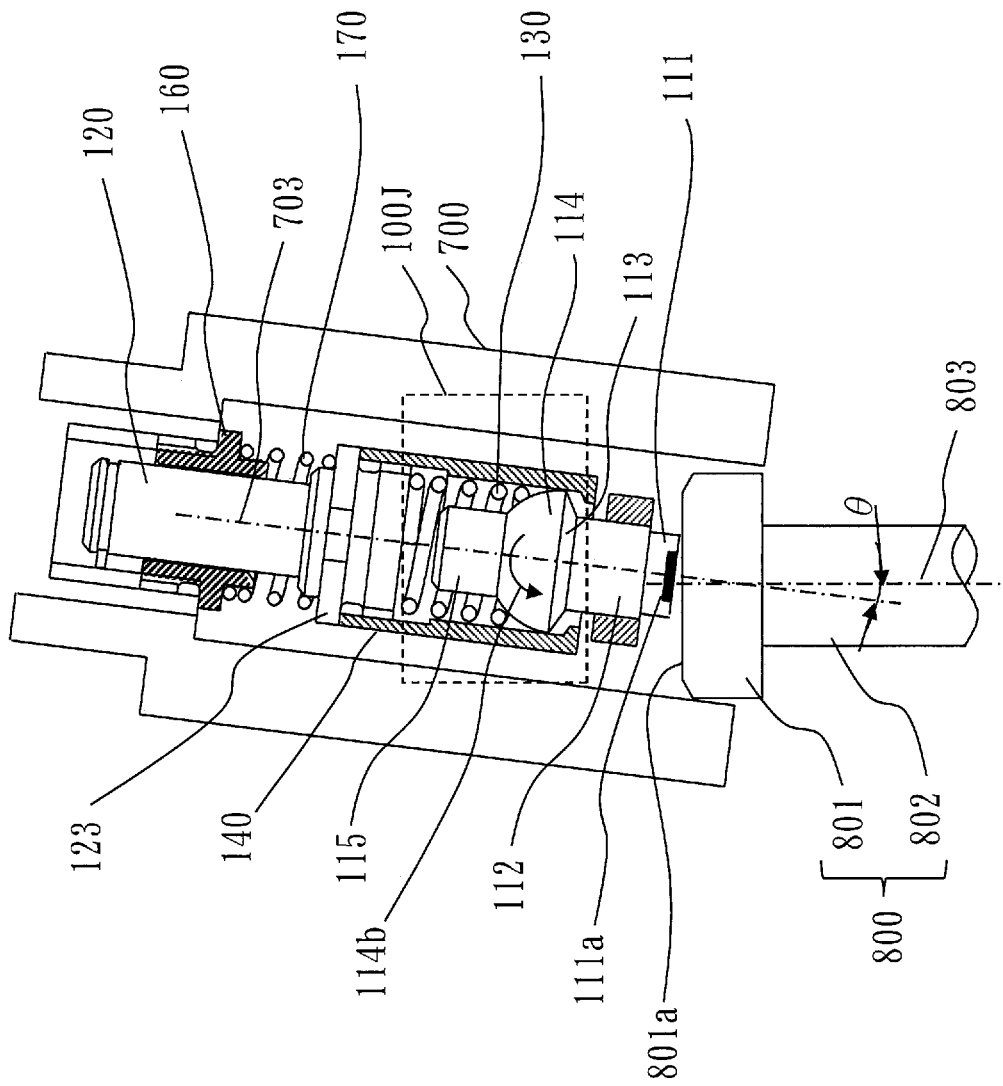
FIG. 7 is a drawing of Embodiment 1, illustrating a difference between an axis line 703 of a socket 700 and an axis line 803 of a bolt shaft 802.

FIG. 7 illustrates a case in which the axis line 703 of the socket 700 and the axis line 803 of the bolt shaft 802 do not match when the operator sets the socket 700 to the hexagon bolt head 801. In FIG. 7, the ultrasonic oscillator 111a accommodated in the oscillator arrangement shaft 111 is illustrated for the sake of convenience. When a tilt angle θ of several degrees occurs between the axis line 703 and the axis line 803, an influence occurs to axial force measurement by ultrasonic waves. To address this tilt angle θ, conventionally, the influence of the tilt angle θ is absorbed only by a spring corresponding to the second coil spring 170. Thus, the absorbable magnitude of the tilt angle θ has a limit.

To address this, in the ultrasonic probe 100, the spherical joint 100J configured of the curved surface part 114 and the first coil spring 130 is provided at a position near the hexagon bolt head 801. In the case of FIG. 7, when the end portion of the oscillator arrangement shaft 111 abuts on the upper surface 801a of the hexagon bolt head 801, the curved surface part 114 rotates to a direction of an arrow 114b.

Figure 8:
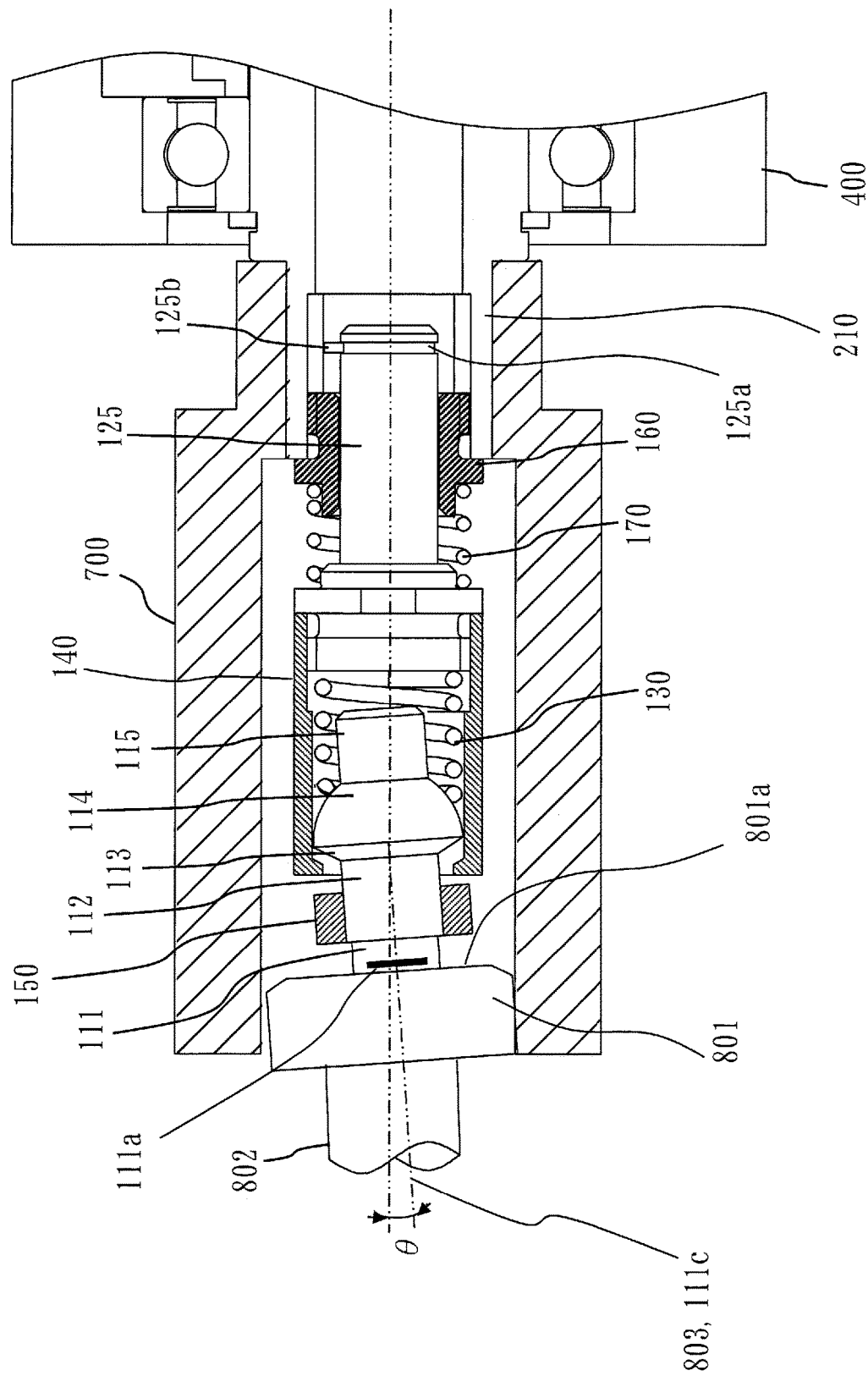
FIG. 8 is a drawing of Embodiment 1, illustrating a state after a curved surface part 114 rotates from the state of FIG. 7.

FIG. 8 illustrates a state of the incidence surface 111b and the upper surface 801a of the hexagon bolt head 801 after the curved surface part 114 rotates to the direction of the arrow 114b from a state of FIG. 7. In FIG. 8, with the rotation of the curved surface part 114, the tilt angle θ between the axis line 803 of the bolt shaft 802 and an axis line 111c of the oscillator arrangement shaft 111 can be eliminated. Thus, a decrease in detection accuracy of the ultrasonic oscillator 111a by the tilted angle θ can be reduced.

Even if the operator fastens the bolt 800 in the state of FIG. 8, the influence of the tilt θ is cancelled between the axis line 803 of the bolt shaft 802 and the axis line 111c of the oscillator arrangement shaft 111. Thus, the ultrasonic bolt axial force meter 1000 can measure the axial force of the bolt 800 with high accuracy. The direction of the axis line 111c matches the direction of the normal of the incidence surface 111b.

In FIG. 8, after fastening the bolt 800 by the nut runner 900, the operator removes the socket 700 from the hexagon bolt head 801. With the socket 700 removed from the hexagon bolt head 801, the oscillator arrangement shaft 111 becomes in a state of not being pressed by the hexagon bolt head 801, and therefore the force applied from the hexagon bolt head 801 to the first coil spring 130 disappears. Thus, deflection of the first coil spring 130 because of being pressed by the hexagon bolt head 801 is restored, and the curved surface part 114 is pressed onto the restraining part 141 of the collar 140 due to the restore of the first coil spring 130 as illustrated in FIG. 3. Here, a portion of the curved surface part 114 pressed onto the restraining part 141 is formed as the tapered part 113. Also, the restraining part 141 is in a tapered shape to be interlocked with the tapered shape of the tapered part 113. Thus, when the oscillator arrangement shaft 111 ceases to be pressed by the hexagon bolt head 801, operation of causing the tapered part 113 to put into the restraining part 141 occurs. With the tapered part 113 putting into the restraining part 141, in the state in which the oscillator arrangement shaft 111 is not pressed by the hexagon bolt head 801, the axis line 703 of the socket 700 and the axis line 111c of the oscillator arrangement shaft 111 always match. That is, when operation makes a transition to the next bolt fastening after bolt fastening by the nut runner 900, the state has always returned to an initial state in which the axis line 111c of the oscillator arrangement shaft 111 and the axis line 703 of the socket 700 match.

Effects of Embodiment 1

Since the ultrasonic probe 100 of Embodiment 1 has the curved surface part 114 and the first coil spring 130 configuring the spherical joint 100J, as for the tilt angle θ illustrated in FIG. 7, an angle larger than ever can be absorbed.

Also, in the ultrasonic probe 100, the tapered part 113 is formed on the curved surface part 114 side. Thus, when the oscillator accommodating part 110 is not pressed by the hexagon bolt head 801, the axis line of the oscillator accommodating part 110 is aligned with the axis line 703 of the socket 700. If the state in which the axis line of the oscillator accommodating part 110 is aligned with the axis line 703 of the socket 700 is called an initial state, the orientation of the oscillator accommodating part 110 returns to the initial state after bolt fastening. Thus, when the bolts 800 are sequentially fastened by the nut runner 900, it is possible to fasten the next bolt 800 from the initial state.

Furthermore, the ultrasonic probe 100 includes the sliding part 120. Thus, for a conventional product using a component corresponding to the sliding part 120, the ultrasonic probe 100 can be used without changes in structure of the conventional product.

Note in Embodiment 1 that, with the second coil spring 170, the sliding part 120 has a so-called floating structure. Although the floating structure is desirable, the sliding part 120 may not have a floating structure. That is, the sliding part 120 may be configured to be attached to the bearing 160 in a fixed state and not to "slide" with respect to the bearing 160.

Also, while the magnet 150 is arranged on the magnet arrangement shaft 112, the arrangement of the magnet 150 is not imperative.

REFERENCE SIGNS LIST

100: ultrasonic probe; 101: first lead wire; 102: second lead wire; 100J: spherical joint; 110: oscillator accommodating part; 111: oscillator arrangement shaft; 111a: ultrasonic oscillator; 111b: incidence surface; 111c: axis line; 112: magnet arrangement shaft; 113: tapered part; 114: curved surface part; 114a: curved surface; 114b: arrow; 115: curved-surface-part-side shaft; 116: accommodation shaft; 120: sliding part; 121: thread part; 122: connecting part; 123: collar receiving part; 124: spring holding part; 125: sliding shaft; 125a: groove; 125b: stopper; 130: first coil spring; 140: collar; 141: restraining part; 141a: surface; 142: thread part; 150: magnet; 160: bearing; 170: second coil spring; 200: rotating hollow shaft; 210: drive square; 220: first cylindrical part; 230: second cylindrical part; 240: third cylindrical part; 241: insertion square; 310: first bearing; 320: second bearing; 330: slip ring structure part; 331: first copper ring; 332: second copper ring; 340: holding member; 351: first brush; 352: second brush; 400: casing; 410: signal takeout part; 411: output connector; 500: rotating device; 600: power device; 601: first grip; 602: second grip; 603: switch; 604: power part; 700: socket; 703: axis line; 800: bolt; 801: hexagon bolt head; 801a: upper surface; 802: bolt shaft; 803: axis line; 811: fastened subject; 811a: upper surface; 900: nut runner; 1000: ultrasonic bolt axial force meter

The invention claimed is:

1. An ultrasonic probe comprising:
an oscillator accommodating part having an accommodation shaft having an ultrasonic oscillator accommodated therein, and a curved surface part connected to one end portion of the accommodation shaft and having formed thereon a curved surface facing a direction opposite to a direction in which the accommodation shaft is present;
an elastic body receiving the curved surface of the curved surface part and producing an elastic force pressing the curved surface; and
an elastic body accommodating part accommodating the elastic body and the curved surface part and restraining movement of the curved surface part pressed by the elastic body, wherein
the curved surface part and the elastic body configure a spherical joint,
the curved surface part includes
a tapered part formed in a tapered shape on a portion connected to the one end portion of the accommodation shaft,
the elastic body accommodating part includes
a restraining part restraining movement of the curved surface part by receiving the tapered shape of the tapered part, and
the tapered part is configured to directly abut the restraining part which is integrally formed with the elastic body accommodating part, to restrain movement of the curved surface part within the elastic body accommodating part.

2. The ultrasonic probe according to claim 1, wherein the restraining part has formed thereon a surface in a tapered shape to be interlocked with the tapered shape formed on the tapered part.

3. The ultrasonic probe according to claim 1, wherein the elastic body accommodating part includes a sliding shaft that is a shaft positioned so as to interpose the elastic body between the sliding shaft and the curved surface part to fit in a bearing, and is a shaft pressed to a direction of the curved surface part by an elastic force of an elastic body different from the elastic body and fitting in the bearing by a stopper so as not to come out of the bearing and in a slidable state.

4. The ultrasonic probe according to claim 1, wherein the curved surface is part of a spherical surface.

5. The ultrasonic probe according to claim 1, wherein the elastic body is a coil spring.

6. The ultrasonic probe according to claim 1, wherein the accommodation shaft includes a magnet.

7. The ultrasonic probe according to claim 1, further comprising a curved-surface-part-side shaft coupled to a side of the curved surface part, wherein
the curved-surface-part-side shaft extends from the curved surface part to a direction opposite to the accommodation shaft, and
the curved surface part curves outward from a longitudinal axis of the curved-surface-part-side shaft, from the curved-surface-part-side shaft to the tapered part.

* * * * *